US012404751B2

(12) United States Patent
Lee et al.

(10) Patent No.: US 12,404,751 B2
(45) Date of Patent: Sep. 2, 2025

(54) METHOD OF COMPLETION OF A WELLBORE

(71) Applicant: Paul Bernard Lee, Kelowna (CA)

(72) Inventors: Paul Bernard Lee, Kelowna (CA); Dayln Beazer, Calgary (CA)

(73) Assignee: Paul Bernard Lee, Kelowna (CA)

( * ) Notice: Subject to any disclaimer, the term of this patent is extended or adjusted under 35 U.S.C. 154(b) by 0 days.

(21) Appl. No.: 18/715,647

(22) PCT Filed: Nov. 7, 2022

(86) PCT No.: PCT/GB2022/052806
§ 371 (c)(1),
(2) Date: May 31, 2024

(87) PCT Pub. No.: WO2023/099861
PCT Pub. Date: Jun. 8, 2023

(65) Prior Publication Data

US 2025/0163782 A1 May 22, 2025

(30) Foreign Application Priority Data

Dec. 3, 2021 (GB) ..................................... 2117526

(51) Int. Cl.
*E21B 43/112* (2006.01)
*E21B 33/128* (2006.01)
(Continued)

(52) U.S. Cl.
CPC .......... *E21B 43/119* (2013.01); *E21B 33/128* (2013.01); *E21B 43/26* (2013.01); *F15B 1/04* (2013.01)

(58) Field of Classification Search
CPC .... E21B 43/112; E21B 43/119; E21B 29/002; E21B 29/005; E21B 29/007
See application file for complete search history.

(56) References Cited

U.S. PATENT DOCUMENTS 8,136,584 B2 * 3/2012 Burnett .................... E21B 23/00 166/297
10,151,164 B2 * 12/2018 Bennett ................. E21B 29/005
(Continued)

FOREIGN PATENT DOCUMENTS

CN 110748329 A 2/2020
WO 2018040139 A1 3/2018

OTHER PUBLICATIONS

Jason Bassi et al., P&A Success with new Technologies Designed for Annulus Remediation in Challenging Subsea HPHT Well Presenters, Jun. 20, 2019, XP093016906, URL:https://www.spe-aberdeen.org/wp-content/uploads/2019/06/110_SPE-Abandonment-slides-2019-revl-Jason-Bassi-DayIn-Beazer.pdf.
(Continued)

*Primary Examiner* — Kenneth L Thompson
(74) *Attorney, Agent, or Firm* — KIRTON McCONKIE; Evan R. Witt

(57) ABSTRACT

An assembly (2) for use in completion of a wellbore to enable hydraulic fracturing to be conducted on the wellbore is described. Assembly (2) comprises hydraulic actuation means comprising at least one hydraulic cylinder (4) and at least one fluid accumulator (6) configured to store hydraulic fluid. Pumping means (8) is arranged to pump fluid into said at least one hydraulic cylinder (4) to actuate said at least one hydraulic cylinder (4). At least one hydraulic setting tool (10) is configured to set a frac plug (12) in a wellbore in response to actuation of said at least one hydraulic cylinder (4). Perforating apparatus (14) comprises at least one perforating element (16) moveable to an outwardly deployed condition to cut a perforation in a wellbore casing.

14 Claims, 6 Drawing Sheets

(51) Int. Cl.

| | |
|---|---|
| ***E21B 43/119*** | (2006.01) |
| ***E21B 43/26*** | (2006.01) |
| ***F15B 1/04*** | (2006.01) |

(56) References Cited

U.S. PATENT DOCUMENTS

| | | | | |
|---|---|---|---|---|
| 2019/0186224 | A1 | 6/2019 | Beazer et al. | |
| 2025/0003306 | A1 * | 1/2025 | Byberg .................... | E21B 31/20 |

OTHER PUBLICATIONS

Lee Energy Systems: "plug and Perf VOICE4", Dec. 13, 2022, XP093016913, URL:https://www.youtube.com/ watch?v=4s11wfs8e3Y &list=PL9jwm9UXaQ-YQb9jSfh08CSwnQ3r8Tf9O@index=17 &ab_channel=LEEENERGYSYSTEMS.

* cited by examiner

Figure 1A:
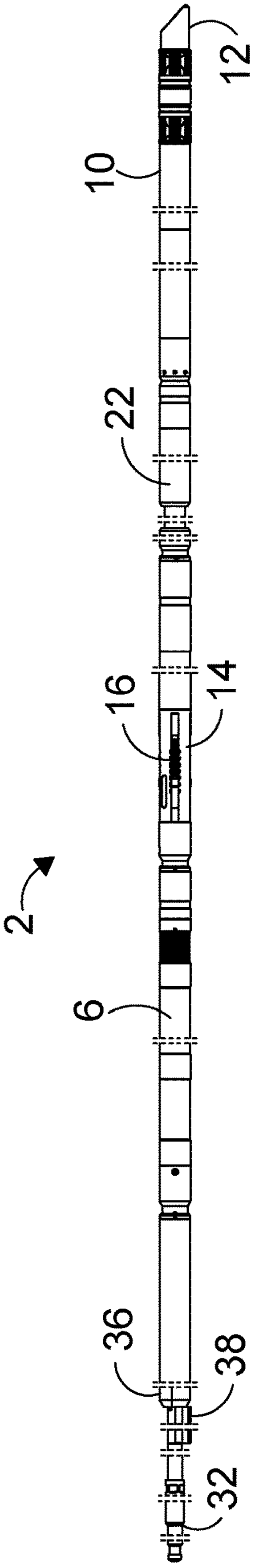
Figure 1B:
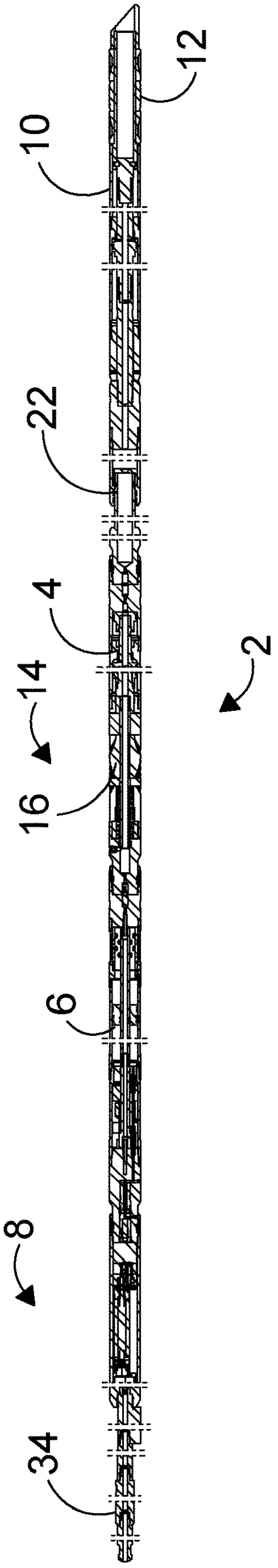
Figure 1C:
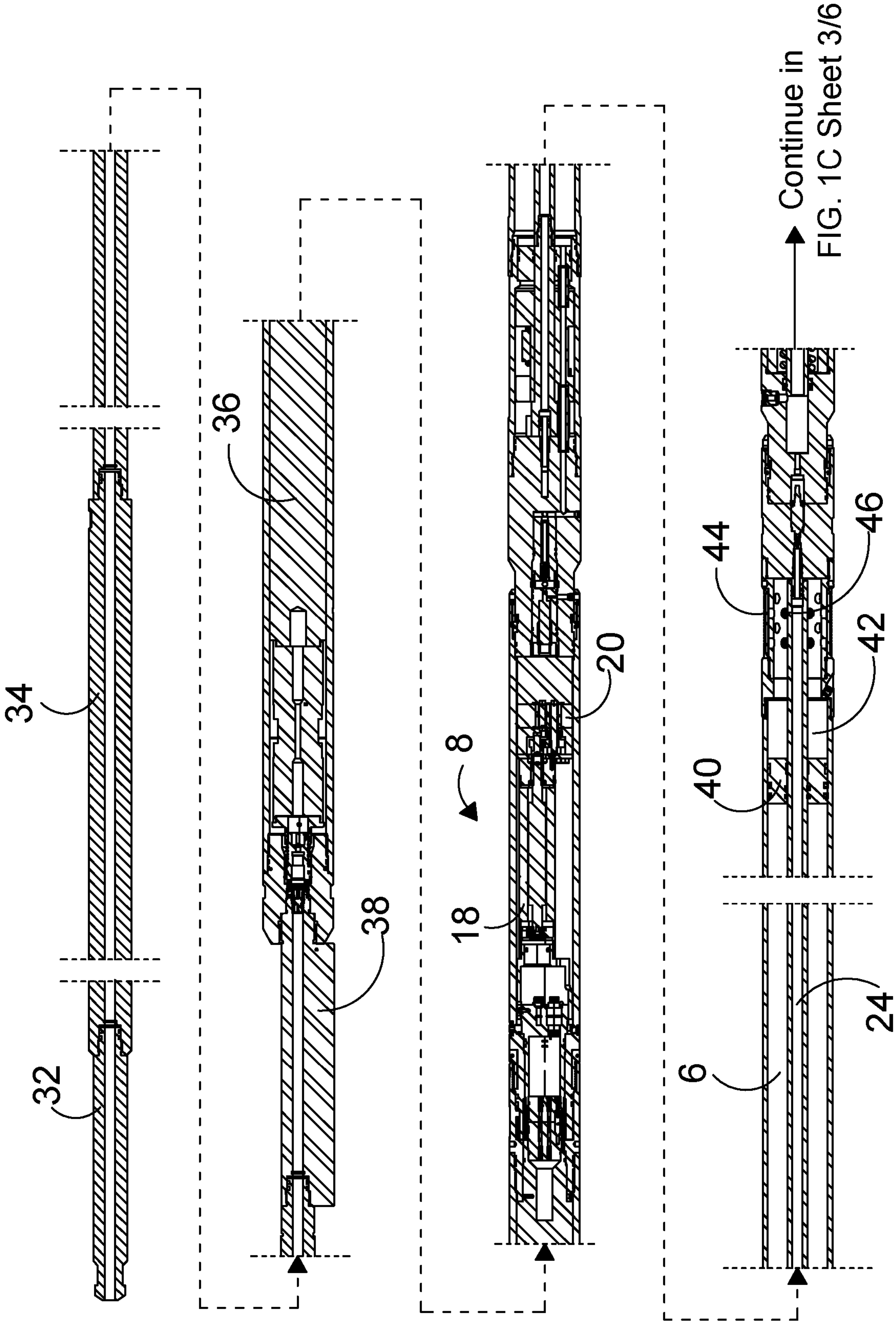

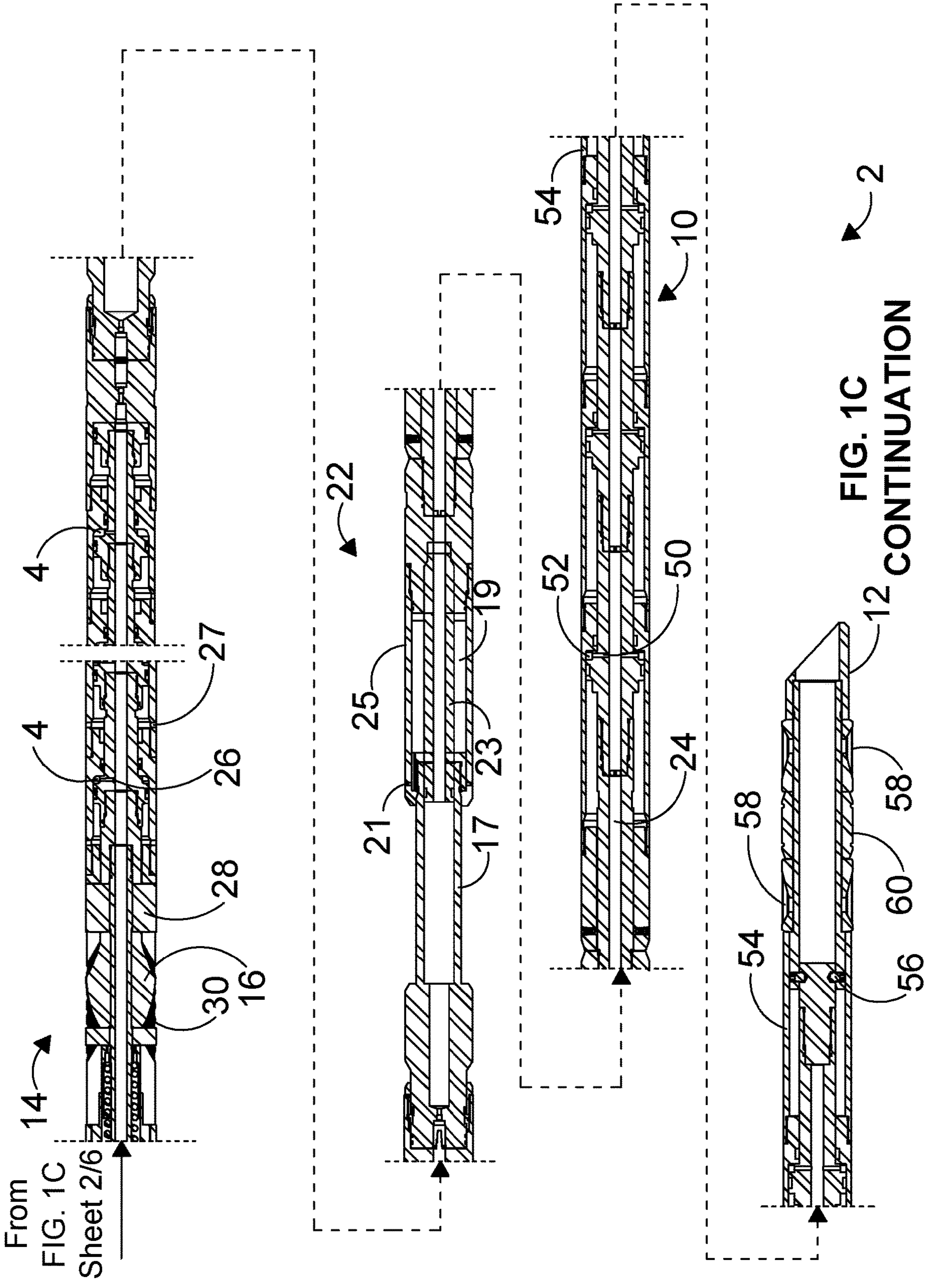
FIG. 1C CONTINUATION

Continuation

METHOD OF COMPLETION OF A WELLBORE

The present disclosure relates to a method of completion of a wellbore to enable hydraulic fracturing to be conducted on the wellbore, and relates particularly, but not exclusively to a method of completion to place a plug in a wellbore and perforate wellbore casing in a plug and perf operation. The present disclosure also relates to an assembly for use in completion of a wellbore to enable hydraulic fracturing to be conducted on the wellbore.

Hydraulic fracturing, also referred to as fracking, is a method of recovery of hydrocarbons from wellbores that typically involves injecting a pressurised fluid and sand mixture into a geological formation to stimulate production of hydrocarbons which are then retrieved from the wellbore. However, the process of drilling the wellbore involves lining the wellbore with tubular casing elements to maintain wellbore integrity. This means that for the pressurised fracking fluid to reach the formation, a barrier known as a frac plug must firstly be placed in the cased wellbore and then the casing above the frac plug perforated to provide access to the formation.

Typically, in standard plug and perf operations, explosive perforating charges are used to perforate the casing. Technicians load charges into a gun which is deployed in the wellbore and activated. The gun is then retrieved and discarded. However, many jurisdictions have strict regulations as regards to the transportation and use of such explosive materials which increases the cost and time required to conduct such plug and perf operations. In addition, handling and using explosive materials is dangerous. Perf guns also produce waste which either has to be disposed of or recycled.

Preferred embodiments of the present disclosure seek to overcome the above disadvantages of the prior art.

According to an aspect of the present disclosure, there is provided a method of completion of a wellbore to enable hydraulic fracturing to be conducted on the wellbore, the method comprising:

- locating an assembly in a wellbore, the assembly comprising:
- hydraulic actuation means comprising:
  - at least one hydraulic cylinder;
  - at least one fluid accumulator configured to store hydraulic fluid; and
  - pumping means arranged to pump said fluid into said at least one hydraulic cylinder to actuate said at least one hydraulic cylinder;
- at least one hydraulic setting tool configured to set a frac plug in a wellbore in response to actuation of said at least one hydraulic cylinder;
- at least one perforating apparatus comprising at least one perforating element moveable between an inwardly retracted condition and an outwardly deployed condition to cut a perforation in wellbore casing in response to actuation of said at least one hydraulic cylinder; and
- a frac plug;
- operating the hydraulic actuation means actuate said at least one hydraulic setting tool and said at least one perforating apparatus to both set said frac plug to form a barrier in the wellbore and perforate casing in the wellbore.

This provides the advantage of a method of conducting a plug and perf operation in a wellbore that does not require the use of explosive charges to perforate wellbore casing.

The assembly can be deployed in a wellbore, actuated to set a frac plug and cut perforations in a casing, moved to a second position at which perforations are desired and actuated again to cut perforations for a second and subsequent times. All of this can be achieved by increasing fluid pressure in the hydraulic chambers of the assembly.

Furthermore, by controlling the length of time that hydraulic fluid is pumped into the hydraulic chambers, the size of the perforations can be chosen by the operators. This is advantageous to ensure that different parts of the formation receive the same quantity of fracturing fluid during the hydraulic fracturing operation.

The method may further comprise the step of moving the assembly to a different position in the wellbore and operating the hydraulic actuation means actuate said at least one perforating apparatus to perforate casing at said different position in the wellbore.

This provides the advantage that the assembly does not have to be retrieved to the surface to conduct second and subsequent perforating operations in the wellbore. This significantly reduces cost and complexity for the operator.

The step of locating an assembly in a wellbore may comprise locating an assembly comprising hydraulic actuation means having a plurality of hydraulic cylinders in the wellbore.

This provides the advantage of enabling a user to increase the force available to the perforating apparatus by increasing the area in hydraulic cylinders on which pressurised fluid is able to act.

In a preferred embodiment, the step of locating an assembly in a wellbore comprises locating an assembly having an umbilical and pumping means comprising an electrically powered pump in the wellbore, wherein the umbilical is configured to supply electric power to at least said electrically powered pump.

This provides the advantage that the assembly can be self-contained and operated on a wireline, e-coil, conductor rod or other electrical deployment method. This avoids the need to pump fluid from the surface and assists in positioning the assembly at the correct position in the wellbore. The umbilical also provides the advantage of enabling the assembly to be retrieved to the surface for re-use and redeployment.

The step of locating an assembly in a wellbore may comprise locating an assembly comprising a control valve to enable actuation of said at least one hydraulic setting tool or said at least one perforating apparatus independently from one another in said wellbore.

This provides the advantage of enabling the frac plug to first be set and then the wellbore perforated multiple times.

The step of locating an assembly in a wellbore may comprise locating an assembly having a motion compensator apparatus configured to compensate for relative movement caused by opposing forces generated by actuation of said at least one perforating apparatus and said at least one hydraulic setting tool in said wellbore.

According to another aspect of the present disclosure, there is provided an assembly for use in completion of a wellbore to enable hydraulic fracturing to be conducted on the wellbore, the assembly comprising:

- hydraulic actuation means comprising:
  - at least one hydraulic cylinder;
  - at least one fluid accumulator configured to store hydraulic fluid; and
  - pumping means arranged to pump said fluid into said at least one hydraulic cylinder to actuate said at least one hydraulic cylinder;

at least one hydraulic setting tool configured to set a frac plug in a wellbore in response to actuation of said at least one hydraulic cylinder; and at least one perforating apparatus comprising at least one perforating element moveable between an inwardly retracted condition and an outwardly deployed condition to cut a perforation in wellbore casing in response to actuation of said at least one hydraulic cylinder.

This provides the advantage of an assembly for conducting a plug and perf operation in a wellbore that does not require the use of explosive charges to perforate wellbore casing.

The assembly can be deployed in a wellbore, actuated to set a frac plug and cut perforations in a casing, moved to a second position at which perforations are desired and actuated again to cut perforations for a second and subsequent times. All of this can be achieved by increasing fluid pressure in the hydraulic chambers of the assembly.

Furthermore, by controlling the length of time that hydraulic fluid is pumped into the hydraulic chambers, the size of the perforations can be chosen by the operators. This is advantageous to ensure that different parts of the formation receive the same quantity of fracturing fluid during the hydraulic fracturing operation.

Said hydraulic actuation means may comprise a plurality of hydraulic cylinders and wherein said pumping means is arranged to pump said fluid into said plurality of hydraulic cylinders to actuate said plurality of hydraulic cylinders.

This provides the advantage of enabling a user to increase the force available to the perforating apparatus by increasing the area in hydraulic cylinders on which pressurised fluid is able to act.

In a preferred embodiment, said pumping means comprises an electrically powered pump and the assembly further comprises an umbilical arranged to supply electric power to at least said electrically powered pump.

This provides the advantage that the assembly can be self-contained and operated on a wireline, e-coil, conductor rod or other electrical deployment method. This avoids the need to pump fluid from the surface and assists in positioning the assembly at the correct position in the wellbore. The umbilical also provides the advantage of enabling the assembly to be retrieved to the surface for re-use and redeployment.

The assembly may further comprise a control valve to enable actuation of said at least one hydraulic setting tool or said at least one perforating apparatus independently from one another.

This provides the advantage of enabling the frac plug to first be set and then the wellbore perforated multiple times.

The assembly may further comprise a frac plug.

The assembly may further comprise a motion compensator apparatus configured to compensate for relative movement caused by opposing forces generated by actuation of said at least one perforating apparatus and said at least one hydraulic setting tool to set a frac plug.

In a preferred embodiment, said motion compensator apparatus comprises at least one tubular element telescopically moveable in a guide member.

The assembly may further comprise a solenoid valve arranged in the event of a loss of power to the assembly to open to enable flow of hydraulic fluid from said at least one perforating apparatus to said accumulator to enable retraction of said at least one perforating element.

This ensure that the assembly can be retrieved form a wellbore in the event of power loss.

A preferred embodiment of the present disclosure will now be described, by way of example only and not in any limitative sense, with reference to the accompanying drawings in which:

FIG. 1*a* is an elevation view of a bottom hole assembly (BHA) comprising an assembly in accordance with the present disclosure for performing a method of completion of a wellbore to enable hydraulic fracturing to be conducted on the wellbore, in which the hydraulic actuation means has not been actuated;

FIG. 1*b* is a longitudinal cross section corresponding to FIG. 1*a;*

Figure 2A:
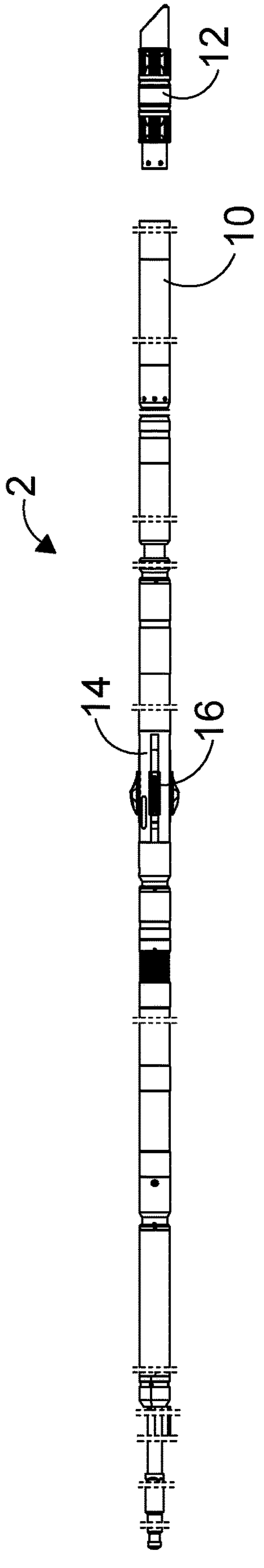
Figure 2B:
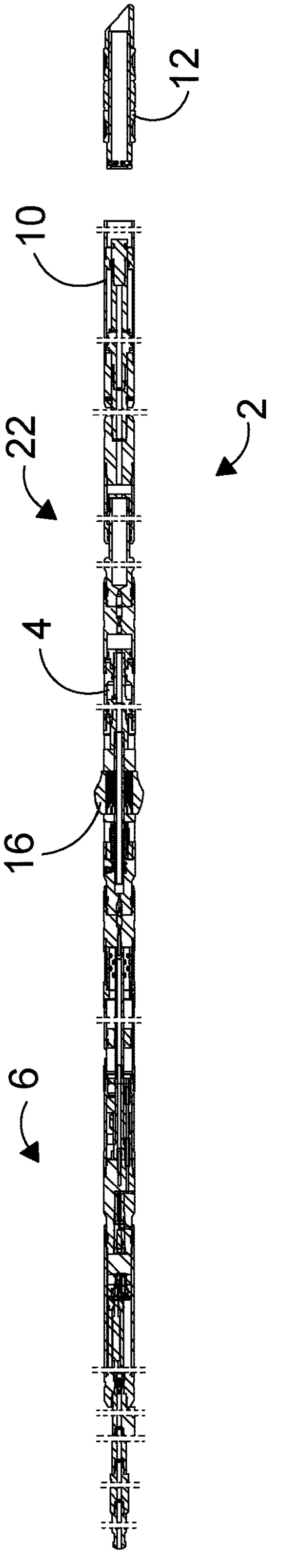
Figure 2C:
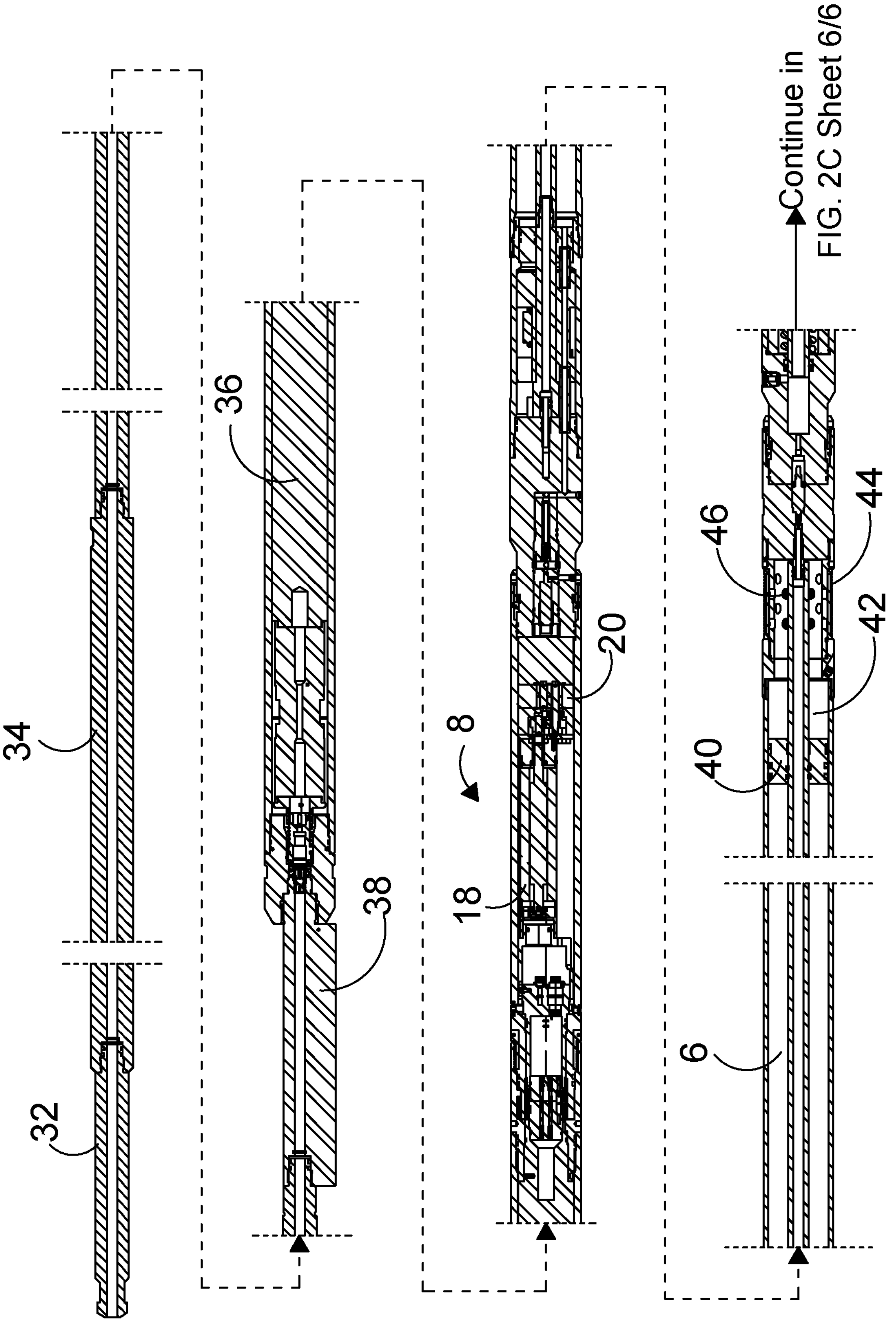
Figure 2C:
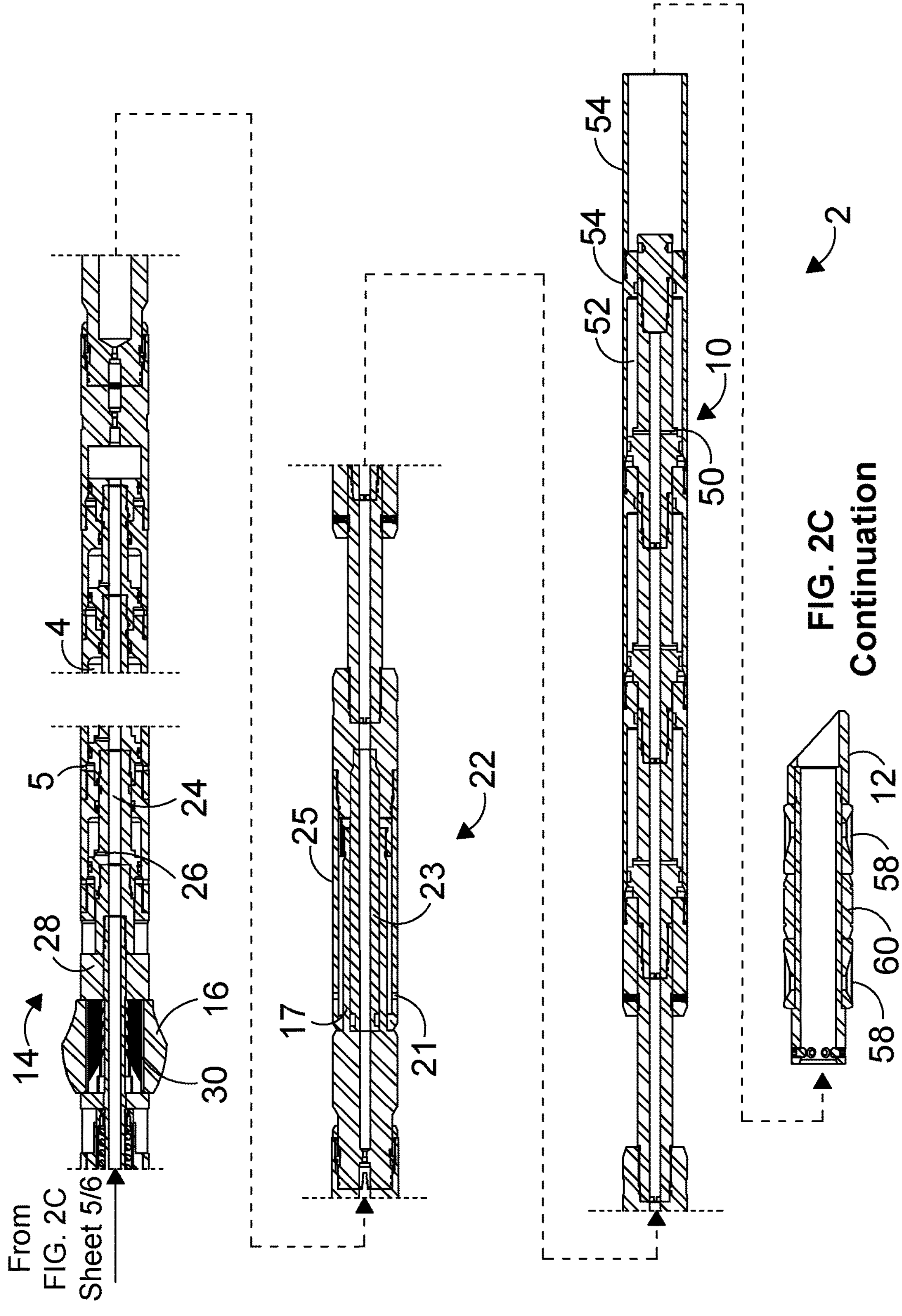

FIG. 1*c* is an expanded cross section corresponding to FIG. 1*b* with the assembly split into sections for ease of viewing;

FIG. 2*a* is an elevation view of the assembly of FIGS. 1*a* and 1*b* in which the hydraulic actuation means has been actuated to set a frac plug and activate the perforating tool;

FIG. 2*b* is a longitudinal cross section corresponding to FIG. 2*a*; and FIG. 2*c* is an expanded cross section corresponding to FIG. 2*b* with the assembly split into sections for ease of viewing.

Referring to FIGS. 1*a* to 1*c*, an assembly 2 for use in completion of a wellbore to enable hydraulic fracturing to be conducted on the wellbore comprises hydraulic actuation means comprising at least one hydraulic cylinder 4 and at least one fluid accumulator 6 configured to store hydraulic fluid. Pumping means 8 is arranged to pump fluid into said at least one hydraulic cylinder 4 to actuate said at least one hydraulic cylinder 4. At least one hydraulic setting tool 10 is configured to set a frac plug 12 in a wellbore in response to actuation of said at least one hydraulic cylinder 4. At least one perforating apparatus 14 is also provided. The perforating apparatus 14 comprises at least one perforating element 16 moveable between an inwardly retracted condition and an outwardly deployed condition to cut a perforation in a wellbore casing in response to actuation of said at least one hydraulic cylinder 4.

Pumping means 8 comprises an electric motor 18 configured to drive a pump 20. Pump 20 draws hydraulic fluid from accumulator 6 and provides pressurised fluid to hydraulic cylinders 4 and hydraulic setting tool 10. Accumulator 6 forms a concentric chamber around central longitudinal bore of the assembly. A floating piston 40 separates hydraulic fluid in reservoir 6 from the opposite side of floating piston 40 which is at the annular pressure of the wellbore. Wellbore fluid can enter area 42 on the opposite side of the floating piston 40 to the accumulator 6 via filter screen 44 and ports 46. As a consequence, when motor 18 operates pump 20, fluid is sucked from accumulator 6 such that floating piston 40 moves to the left in the drawings. The fluid is then fed through internal valves and flows back in the opposite direction along longitudinal bore 24 to the perforating tool 14 and hydraulic setting tool 10.

A plurality of hydraulic chambers 4 are provided in a modular assembly. This increases the surface area on which pressurised fluid can act to enable increased force to be applied to the perforating tool 14. This also enables the operator to specify how many hydraulic cylinders 4 might be required for operation in particular wellbore conditions.

The hydraulic setting tool 10 is configured to set frac plug after actuation by pressurised hydraulic fluid provided by the pumping means 8. Hydraulic setting tool 10 comprises an outer sleeve 54 arranged to compress frac plug 12 in response to pumped hydraulic fluid in bore 24 entering setting tool hydraulic chambers 52 through internal ports 50.

The frac plug of FIG. 1*c* is connected to the hydraulic setting tool by sheer pins 56. As sleeves 54 push against frac plug 12, slips 58 deploy outwardly against the casing to grip the casing as elastomeric sealing packer element 60 is compressed. As a pre-determined force, sheer pins 56 break to release the frac plug which is set in the casing. Due to the upward movement of the assembly caused by movement of outer sleeve 54, motion compensator sub 22 telescopes to absorb the upward movement.

Motion compensator sub 22 is provided and uses a telescopic arrangement which counteracts the upward force caused by actuation of the hydraulic setting tool 10 and the downward force caused by actuation of perforating tool blades 16. Motion compensator sub 22 comprises a wash pipe 23 to act as a telescopic tube and conduit to transfer the hydraulic fluid though the assembly into the setting tool 10. Wash pipe 23 is telescopically moveable in guide member 17. Wash pipe 23 eliminates any internal pressure acting on the mandrel 25 of the compensation tool. Motion compensator sub 22 also comprises an annular port 21 to allow annular fluid to fill chamber 19. The wash pipe 23 is sealed on a smaller diameter. This enables a decrease in pump open force of the system whilst maintaining tensile integrity. Holes may be provided in the lower end of the assembly to allow wellbore fluids into the assembly 2 to displace fluid in and out of ports depending on direction of travel.

Hydraulic chambers 4 communicate to the longitudinal bore 24 of the assembly via internal ports 26. When pressurised fluid enters bore 24 it then flows into hydraulic chambers 4 through internal ports 26 causing the size of hydraulic chambers 4 to increase (comparing FIGS. 1*c* and 2*c*). This pushes block 28 to cause perforating element 16 to ride up inclined grooves 30 to move to the outwardly deployed condition to cut a perforation in casing in a wellbore. Annular ports 27 are located through the assembly housing to enable annular wellbore fluid to be flushed during expansion of hydraulic cylinders 4.

In use, the assembly 2 is assembled in a bottom hole assembly (BHA) comprising a cable head 32 for connection to a wireline, e-coil or other electrical deployment method. A release tool 34 is provided to enable a signalled release if the apparatus 2 becomes stuck. A telemetry sub 36 is provided which may include formation logging tools to learn about formation lithology.

Assembly 2 may also comprise a counterbalance weight in the form of orientation sub 38 so that the perforating elements are arranged in the correct orientation in a horizontal well. For example, perforating elements 16 can be disposed 90 or 180 degrees from the counterbalance weight of the orientation sub 38 such that the perforations will be cut upwardly in a horizontal casing.

Assembly 2 also comprises a solenoid valve in pumping means 8 such that if there is ever a power outage, the solenoid valve will open to enable flow of hydraulic fluid from the perforating apparatus 14 and setting tool 10 back to the accumulator 6. This causes perforating elements 16 to retract by means of pulling on the assembly 2 to enable retrieval of the assembly 2 to the surface. This can prevent the loss of a wellbore's ability to produce hydrocarbons.

A method of completion of a wellbore to enable hydraulic fracturing to be conducted on the wellbore will now be described using assembly 2 with reference to FIGS. 1*a* to 1*c* and 2*a* to 2*c*.

The bottom hole assembly comprising assembly 2 is deployed into a cased wellbore either by pumping or using a tractor. Formation logging sub 36 provides data to the operators to determine areas suitable for hydraulic fracturing.

Once the assembly 2 has been located at the toe of the well, a wireline signal is used to activate the motor 18 and pump to pump fluid from accumulator 6 to hydraulic setting tool 10. The hydraulic setting tool actuates frac plug 12 to deploy the frac plug 12 to form a barrier in the wellbore. During this procedure, frac plug 12 separates from assembly 2 as explained above.

At the same time, the motor 18 and pump 20 are used to pump fluid from accumulator 6 into hydraulic cylinders 4 to deploy perforating elements to cut perforations in the cased wellbore. The assembly 2 can then be repositioned in the wellbore and the perforating step repeated. The umbilical can then be used to pull the assembly to the surface for reuse. This avoids the waste generated by use of perf guns.

A control valve system to enable actuation of the hydraulic setting tool 10 or perforating apparatus 14 independently from one another may be provided.

Assembly 2 is advantageous compared to use of explosive charges (perf guns) for perforating because perf guns are single use and must be discarded as waste or recycle once retrieved to the surface. Assembly 2 can be re-used multiple times thus greatly reducing waste and environmental impact.

Operators are also limited in how many perf guns can be run on a BHA. If the assembly is too long it is unmanageable by surface operators. It is therefore common to have one gun/cluster fired in the middle of a joint of casing.

On the other hand, assembly 2 it capable of cutting at multiple locations in the casing. This means that rather than all of the total flow area (TFA) of the stimulation entering the formation say for example every 45 feet (13.7 metres) in the centre of the casing as happens with perf gun perforating, assembly 2 enables equal spacing of TFA over the length of the casing with multiple cuts/perforations made along the length of the casing. This improves hydraulic fracturing results as it allows the stimulation material to enter the formation over many points along the length of the casing.

Assembly 2 and perforating tool 14 also enable control of the size of casing perforations made to manage TFA distribution. The extent of outward deployment of perforating elements 16 is controlled by the length of time pump 20 is operated. The longer the pump is operated, the greater the extent of deployment and therefore size of casing perforation made.

In this regard, one stimulation stage along a wellbore might consist of six casing joints so often the casing perforations furthest away from surface or the pump are not effectively stimulated as they are starved of fluid volume. To ensure the fracturing fluid is equally displaced into all perforations, the upper perforations can be made smaller so as to save fluid volume for the lower perforations.

It will be appreciated by persons skilled in the art that the above embodiment has been described by way of example only and not in any limitative sense, and that various alterations and modifications are possible without departure from the scope of protection as defined by the appended claims.

The invention claimed is:

1. A method of completion of a wellbore to enable hydraulic fracturing to be conducted on the wellbore, the method comprising:

locating an assembly in a wellbore, the assembly comprising:

an hydraulic actuator comprising:

at least one hydraulic cylinder;

at least one fluid accumulator configured to store hydraulic fluid; and a pump arranged to pump said fluid into said at least one hydraulic cylinder to actuate said at least one hydraulic cylinder;

at least one hydraulic setting tool configured to set a frac plug in a wellbore in response to actuation of said at least one hydraulic cylinder;

at least one perforating apparatus comprising at least one perforating element moveable between an inwardly retracted condition and an outwardly deployed condition to cut a perforation in wellbore casing in response to actuation of said at least one hydraulic cylinder; and a frac plug;

operating the hydraulic actuator to actuate said at least one hydraulic setting tool and said at least one perforating apparatus to both set said frac plug to form a barrier in the wellbore and perforate casing in the wellbore.

2. A method according to claim 1, further comprising the step of moving the assembly to a different position in the wellbore and operating the hydraulic actuator to actuate said at least one perforating apparatus to perforate casing at said different position in the wellbore.

3. A method according to claim 1, wherein the step of locating an assembly in a wellbore comprises locating an assembly comprising an hydraulic actuator having a plurality of hydraulic cylinders in the wellbore.

4. A method according to claim 1 wherein the step of locating an assembly in a wellbore comprises locating an assembly having an umbilical and pump comprising an electrically powered pump in the wellbore, wherein the umbilical is configured to supply electric power to at least said electrically powered pump.

5. A method according to claim 1, wherein the step of locating an assembly in a wellbore comprises locating an assembly comprising a control valve to enable actuation of said at least one hydraulic setting tool or said at least one perforating apparatus independently from one another in said wellbore.

6. A method according to claim 1, wherein the step of locating an assembly in a wellbore comprises locating an assembly having a motion compensator apparatus configured to compensate for relative movement caused by opposing forces generated by actuation of said at least one perforating apparatus and said at least one hydraulic setting tool in said wellbore.

7. An assembly for use in completion of a wellbore to enable hydraulic fracturing to be conducted on the wellbore, the assembly comprising:

an hydraulic actuator comprising:

at least one hydraulic cylinder;

at least one fluid accumulator configured to store hydraulic fluid; and a pump arranged to pump said fluid into said at least one hydraulic cylinder to actuate said at least one hydraulic cylinder;

at least one hydraulic setting tool configured to set a frac plug in a wellbore in response to actuation of said at least one hydraulic cylinder; and at least one perforating apparatus comprising at least one perforating element moveable between an inwardly retracted condition and an outwardly deployed condition to cut a perforation in wellbore casing in response to actuation of said at least one hydraulic cylinder.

8. An assembly according to claim 7, wherein said hydraulic actuator comprises a plurality of hydraulic cylinders and wherein said pump is arranged to pump said fluid into said plurality of hydraulic cylinders to actuate said plurality of hydraulic cylinders.

9. An assembly according to claim 7, wherein said pump comprises an electrically powered pump and the assembly further comprises an umbilical arranged to supply electric power to at least said electrically powered pump.

10. An assembly according to claim 7, further comprising a control valve to enable actuation of said at least one hydraulic setting tool or said at least one perforating apparatus independently from one another.

11. An assembly according to claim 7, further comprising a frac plug.

12. An assembly according to claim 7, further comprising a motion compensator apparatus configured to compensate for relative movement caused by opposing forces generated by actuation of said at least one perforating apparatus and said at least one hydraulic setting tool to set a frac plug.

13. An assembly according to claim 12, wherein said motion compensator apparatus comprises at least one tubular element telescopically moveable in a guide member.

14. An assembly according to claim 7 further comprising a solenoid valve arranged in the event of a loss of power to the assembly to open to enable flow of hydraulic fluid from said at least one perforating apparatus to said accumulator to enable retraction of said at least one perforating element.

* * * * *